Feb. 18, 1947.    A. M. SKELLETT    2,415,855

RANGE INDICATOR

Filed July 26, 1944

V4 TUBE PATTERN

INVENTOR
A. M. SKELLETT
BY
Hugh S. Wertz
ATTORNEY

Patented Feb. 18, 1947

2,415,855

UNITED STATES PATENT OFFICE 2,415,855

RANGE INDICATOR

Albert M. Skellett, Madison, N. J., assignor to Bell Telephone Laboratories, Incorporated, New York, N. Y., a corporation of New York Application July 26, 1944, Serial No. 546,630

7 Claims. (Cl. 161—15)

This invention relates primarily to object locating and distance measuring systems of the pulse reflection type and more particularly to a circuit for producing a distinctive visible indication when a pulse produced by reflection from a target is in synchronous relationship with a pulse produced a controllable and measurable length of time after the radiated pulse producing the reflection.

The invention is particularly applicable to and will be described by way of example in connection with a pulse reflection type system employing radio waves, commonly called a radar system, but it is applicable as well to pulse reflection systems employing other types of waves, as, for example, sound ranging systems employing compressional sound waves. In certain of its aspects the invention is not limited to use with object locating distance measuring systems as will be apparent from the accompanying description and appended claims.

A radar system usually includes a transmitting device adapted to emit radio frequency pulses of very short duration (called "transmitted" or "radiated" pulses) at frequent intervals, a receiving device at the same location for picking up and detecting reflection or echo pulses which are reflected from objects or targets on which the radiated or transmitted pulses impinge, and a suitable indicator such as a cathode-ray oscilloscope having its sweep synchronized with the period of the radiated pulses for causing images of the detected echoes in the order of their reception to be displayed along a time axis on the fluorescent screen thereof so as to provide a measure of the time interval elapsing between the emission of each radiated pulse and the reception of a corresponding echo at the observation point. The elapsed interval is proportional to the distance to the object causing the echo and may be translated into distance units. In one known type of radar system, there is provided a variable delay unit (called hereinafter a "range unit") for producing a pulse a variable and controllable interval of time after each radiated or transmitted pulse and this range unit pulse (or another pulse produced therefrom) is applied to the same set of deflecting elements to which the echo pulses are applied to produce a marker pulse on the fluorescent screen adjacent a small portion of the trace of the video signal (comprising the echo pulses). By varying the time delay of the range unit output pulse until the marker pulse overlaps or coincides in time with an echo pulse, the delay indicated on the range dials of the range unit is a measure of the distance to the target producing this echo. This arrangement, however, is subject to a number of disadvantages. The area on the screen of the cathode ray tube that is used for the indication of the particular echo which is being aligned with the marker pulse is not over a square centimeter or two and to produce this the cathode-ray tube is usually accompanied by a power supply which produces thousands of volts and by sweep and other cathode-ray tube auxiliary circuits. The present invention, in one of its primary aspects, is concerned with the provision of a precision range measuring equipment which does not require a cathode-ray oscilloscope and its accompanying auxiliary apparatus and circuits.

It is an object of this invention to provide novel pulse-actuated means for indicating the presence of an object and for measuring the distance thereto.

It is another object of this invention to provide a precision range measuring equipment utilizing a relatively small number of circuit elements.

It is another object of this invention to provide a novel pulse-actuated object locating and distance measuring system utilizing a simple indicating device for indicating the coincidence of an echo pulse and of a pulse produced a measurable and controllable period of time after each radiated pulse producing the echo.

In accordance with one embodiment of the invention shown by way of example for purposes of illustration there is provided a simple range indicator circuit comprising an electron ray indicating tube (frequently called a "magic eye" tube) and three other tubes which is intended to be used with a range unit of the type which is disclosed in an application of L. A. Meacham, Serial No. 491,791, filed June 22, 1943, or in an article entitled "The SCR—584 radar" in the February 1946 issue of "Electronics" beginning on page 110, for example. A negative pulse produced by the range unit is applied to the first tube in the range indicator circuit which comprises a double triode the two portions of which are connected as a multivibrator to produce a positive square-topped gate pulse which is applied to the control grid of a mixer tube to the cathode of which is applied the video signal. This tube is normally biased well below cut-off so that the grid is approximately at cut-off potential when the range gate pulse is applied thereto. Thus, an echo pulse in the video signal passes through the mixer tube only when there is an overlap in time of the range gate pulse and an echo in the video signals. The mixer tube output signals are applied to a peak voltmeter to form a direct voltage representative of the amplitude of the pulses. This direct voltage is applied to the control grid of a "magic eye" indicator tube. When the range gate pulse coincides in time with an echo pulse, the pattern on the fluorescent screen of the indicator tube is a large dark area about 90 to 100 degrees wide but when the gate pulse does not coincide with an echo pulse, the pattern is a thin bright line. By turning the range dial on the range unit, a survey of all the echoes being received can be made and the ranges of the various targets causing the echoes can be read on the range dial.

The invention will be more readily understood by referring to the following description taken in connection with the accompanying drawing forming a part thereof in which.

Figure 1:
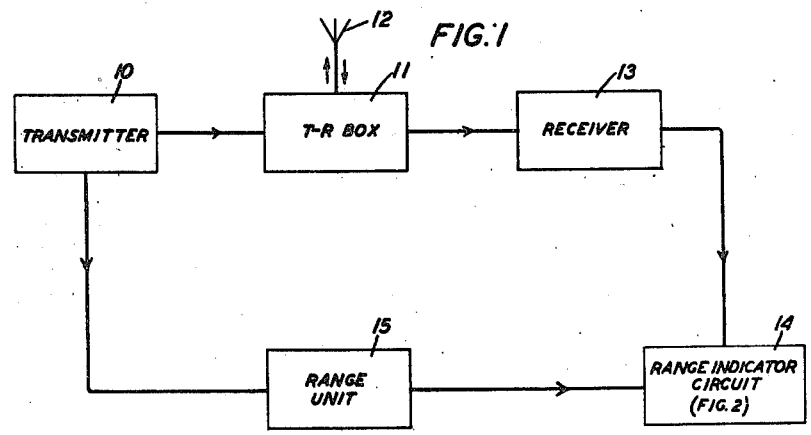
Fig. 1 is a schematic block diagram of a radar system employing a novel range indicator circuit in accordance with this invention.

Referring more particularly to the drawing, Fig. 1 shows by way of example for illustrative purposes, a radar system utilizing a simplified range indicator circuit. Fig. 1 is a single line block diagram to show the relationship of the various major elements of the system and is not intended to be a circuit diagram. In the arrangement of Fig. 1, an ultra-high frequency pulse modulated wave is produced in the transmitter 10. The transmitter may comprise, for example, a high voltage rectifier of any suitable form which supplies about 12,000 volts direct current to a suitable charging circuit or element capable of producing a still higher voltage. After the charging voltage builds up to about 21,000 volts, any suitable rotary spark gap discharges the capacitor in the charging circuit. This discharge takes place in about one microsecond and causes a magnetron oscillator in the transmitter to oscillate for this brief period and send short pulses of radio frequency energy through a T-R box 11 to transmit to an antenna 12 which, for example, includes a wave guide and a parabolic reflector. Any suitable antenna may be used. Radiations from the antenna strike one or more objects and produce reflections or echoes therefrom which are received by the antenna 12 and transmitted through the T-R box 11 to the receiver 13. The T-R box can be of any desirable type, for example that employing a Western Electric Company 709-A tube in a resonant cavity. This tube is filled with an ionizable gas and has a small gap therein. During reception of the low voltages of the received energy, the gas is not ionized, the cavity is tuned to resonance and the received energy is applied to the receiver 13. During the emission of a transmitted or radiated pulse from the transmitter 10, the voltage due to the pulse ionizes the gas thus detuning the cavity and substantially preventing the energy of the pulse from reaching the receiver 13.

In the receiver 13 the received waves are heterodyned to a convenient intermediate frequency and these intermediate frequency waves are amplified, detected and applied to the range indicator circuit 14 with such polarity that the echo pulses are in a negative direction. The circuit 14 will be described more fully below.

Figure 2:
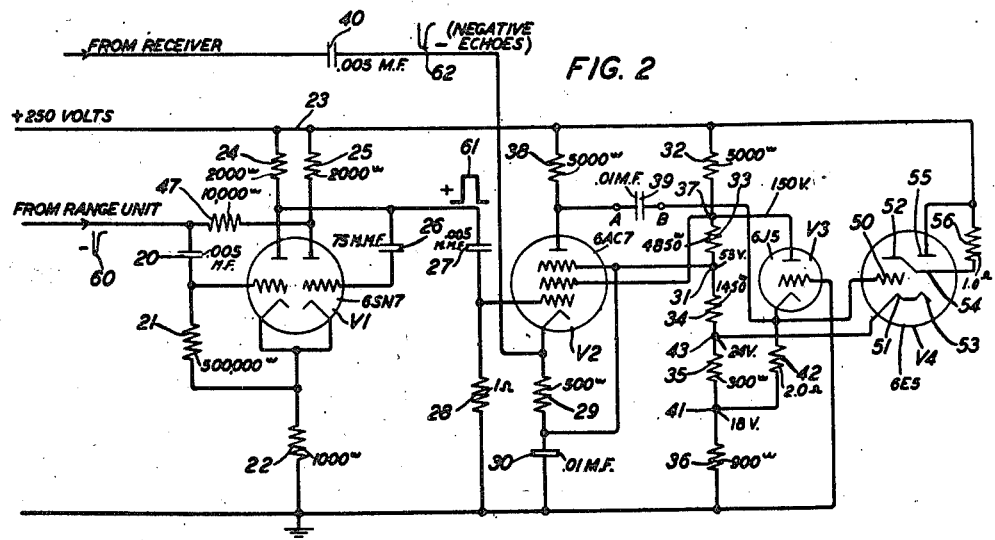
Fig. 2 is a circuit diagram of the range indicator circuit.

Pulse energy from the transmitter 10, which is in the nature of a synchronizing pulse, controls the range unit 15 which is essentially a variable delay circuit or unit which produces a pulse, for example in the negative sense, of predetermined duration and a controllable period of time after the initiation of the pulse from the transmitter 10, which is in the same position as, or slightly after the radiated pulse. A suitable range unit is disclosed in the L. A. Meacham application or in the "Electronics" article mentioned above. The output pulse from the range unit 15 comprises, as shown in Fig. 2, a sharp negative pulse 60 which is applied to the tube V1 in the range indicator circuit shown in that figure.

The tube V1 comprises a double triode such as a 6SN7 tube. The range unit pulse is applied to the control grid of the left half of this tube through the coupling condenser 20 while a leak resistor 21 is connected between the grid and cathode of this half of the tube. The cathode of the left half is also connected to the cathode of the right half and both cathodes are connected to ground through the resistor 22. The anodes of the left and right halves of the tube V1 are connected to the positive terminal 23 of a source of direct voltage of, for example, 250 volts through anode resistors 24 and 25, respectively. The anode of the left half of the tube V1 is connected to the control grid of the right half through a coupling condenser 26 while the anode of the right half is connected to the control grid of the left half through the resistor 47 and the coupling condenser 20. The two halves of the tube V1 are thus cross-connected as a multivibrator to produce a positive square-topped pulse 61 at the plate of the left half of the tube, which pulse, as shown in Fig. 2, is applied to the control grid of the tube V2 through the coupling condenser 27.

The control or first grid of the tube V2 is connected to ground through the leak resistor 28 while the cathode is connected to ground through the resistor 29 and the by-pass condenser 30. The common terminal of the elements 29 and 30 is connected to the suppressor or third grid which is connected to a point 31 on the potentiometer comprising the resistors 32, 33, 34, 35 and 36 connected between the terminal 23 and ground. By way of example the point 31 on this potentiometer has a potential of about 53 volts positive with respect to ground. The screen or second grid of the tube V2 is connected to a point 37 on this potentiometer which has a potential of about 150 volts. The anode of the tube V2 is connected to the positive terminal 23 through the resistor 38 and through the coupling condenser 39 to the cathode of the triode V3. Negative echo pulses 62 from the receiver 13 are applied to the cathode of the tube V2 through the coupling condenser 40. Due to the positive potential applied to the cathode of the tube V2 from the point 31 on the potentiometer, the tube V2 is normally biased well below cut-off to such an extent that the control grid is approximately at cut-off potential when the range gate pulse 61 from the tube V1 is applied to the control grid of the tube V2. The negative echo pulses from the receiver 13 thus get through the amplifier mixer tube V2 only when there is an overlap or coincidence in time of an echo pulse 62 and a range gate pulse 61. When the tubes V2 and V3 are not passing current the coupling condenser 39 has a potential of approximately 250 volts at its left-hand terminal A and one of approximately 18 volts positive at its right-hand terminal B since this terminal is connected to a point 41 on the potentiometer having this potential through the large resistor 42.

Figure 3:
Fig. 3 shows the pattern on the fluorescent screen of the magic eye indicator tube when an echo pulse and a gate pulse coincide in time.

The control grid of the tube V3 is placed at ground potential while the anode is connected to the point 37 of the potentiometer which is substantially 150 volts positive with respect to ground. The tube V3 acts as a rectifier and amplifier of the pulses produced in the output of the tube V2 and serves with the condenser 39 and the resistor 42 as a peak voltmeter to produce a direct voltage representative of the amplitude of the output pulses produced at the anode of the tube V2. This direct voltage is applied to the control grid 50 of the tube V4 which by way of example is a 6E5 tube (frequently called a "magic eye" indicating tube) of the electron ray type. This tube comprises a first part comprising a triode or direct current amplifier including a cathode 51, the control grid 50 and an anode 52 and a second part comprising a continuation 53 of the cathode 51, a shadow casting or control electrode 54 and a fluorescent screen or target 55. An end-on view of the target 55 is shown in Fig. 3. A tube of this type is shown on page 30 of the booklet entitled "RCA Receiving Tube Manual" (1940). The target 55 is connected directly to the positive terminal 23 and through a resistor 56 to the anode 52 and the shadow casting electrode 54 which are electrically connected together. The target 55 attracts electrons from the cathode 53 when the grid 50 is above its cut-off potential. When the electrons strike the target they produce a glow on the fluorescent coating thereof. Under these conditions the target appears as a ring of light. The ray control electrode 54 mounted between the cathode and target is at a less positive potential than the target when electrons are flowing due to the potential drop in the resistor 56 and hence electrons flowing to the target are repelled by the electrostatic field between these electrodes and do not reach that portion of the target behind the electrode 54. Because the target does not glow where it is shielded from electrons, the control electrode 54 casts a shadow on the glowing target. The extent of this shadow varies from approximately 90 degrees to 100 degrees of the target when the control electrode is much more negative than the target to substantially 0 degrees when the control electrode is at approximately the same potential as the target. When the voltage of the grid 50 changes in the positive direction, the plate current increases and the potential of the control electrode 54 goes down because of the increased drop across the resistor 56 and hence the shadow angle widens. When the potential of the grid 50 changes in the negative direction, the shadow angle narrows.

The operation of the circuit shown in Fig. 2 in the system of Fig. 1 will now be described. Radio frequency pulses of short duration are transmitted from the antenna 12 and received by the receiver 13 in the manner described above and negative echo pulses 62, such as those shown in Fig. 2, are applied to the cathode of the tube V2. There may be one or more of these echo pulses following each pulse radiated from the antenna 12, depending on the number of objects producing reflections within the range of the equipment. For simplicity in the drawings, however, only one negative echo 62 has been shown in Fig. 2. Negative range unit pulses are applied to the multivibrator V1 to produce for each range unit pulse a positive square-topped pulse 61 in the output circuit thereof in a manner well known. The pulse 61 is called a range gate pulse and is applied to the control grid of the tube V2. It is to be understood that the time of each range gate pulse 61 with respect to the corresponding radiated pulse from the transmitter is determined by the setting of the dials in the range unit 15 and can be varied at will by turning the dials on the range unit. When the time of the range gate pulse 61 from the tube V1 overlaps the time of an echo pulse 62 from the receiver 13, the tube V2, as pointed out above, conducts and causes the potential of the terminal A of the condenser 39 to drop suddenly from a value of about 250 volts to a much lower value. Terminal B of the condenser 39, which has previously been at a potential of about 18 volts due to the fact that the tube V3 is not conducting, follows this potential variation and its potential also swings in the negative direction. The potential of the cathode of the tube V3, which is directly connected to the terminal B of the condenser 39, also swings in a negative direction and the tube V3 thereby conducts current producing a flow of current through the resistor 42 and varying the charge on the condenser 39. At the termination of the echo, the cathode of the tube V3 and hence the grid 50 of the tube V4 is driven in a positive direction due to the anode returning to its maximum voltage and to this charge variation, thus opening up the dark area of the screen 55. When the grid 50 of the tube V4 is negative with respect to the cathode 51 thereof, the pattern of the tube screen is a single bright line (the "magic eye" is just "overclosed"), but when the grid 50 swings in a positive direction, due to the coincidence of the range gate 61 and an echo pulse 62, the pattern opens up to a dark sector about 90 to 100 degrees wide as shown by the shaded area in Fig. 3. As the coupling condenser 39 discharges through the large resistor 42 with a time constant considerably longer than the pulse interval, the dark sector of the electron ray tube V4 remains open to a width proportional to the amplitude of the echo as long as the coincidence of echo and gate is maintained. The action of the tube V3 in conjunction with the coupling condenser 39 and the resistor 42 is similar to that of a peak vacuum tube voltmeter. The tube V3, being a triode, also serves to amplify the pulses in the output of the tube V2. The potential of the cathode of the tube V3 and hence of the grid 50 of the tube V4 is a direct voltage substantially representative of the amplitude of the pulses produced at the plate of the tube V2 and hence of the echo pulses 62. By turning the dials on the range unit 15 to vary the spacing of the range gate pulses 61 produced in the output of the tube V1 with respect to the transmitted pulses radiated from the antenna 12, a survey may be made of all of the echoes being received, each echo being indicated by a pattern like that shown in Fig. 3. A reading of the range unit dial when such a pattern is produced gives with precision the range to the target. By way of example in a system of the type disclosed accuracies of the order of two yards in 15,000 have been obtained.

While the invention has been shown and described in connection with a pulse actuated object locator and distance measuring system, it will be obvious that the principles and apparatus are applicable to other pulse actuated systems wherein it is desired to indicate the coincidence in time of two pulses. Moreover, it is obvious that certain elements of the system described above can have uses other than in indicating systems.

The circuit constants of an operative form of the invention have been indicated on the drawing but it is to be understood that the invention is not limited to the use of these specific circuit constants as a change of one or more of the variables of the system may necessitate a change of the circuit constants in a manner understood by all those skilled in the art.

What is claimed is:

1. A device adapted to have applied thereto a first series of pulses and a second series of pulses, the individual ones of which are time spaced from corresponding pulses of the first series by substantially equal periods, and to give an indication of the duration of said periods comprising means for forming a third series of voltage variations time spaced like the first series but in which the individual ones are displaced by a controllable and measurable period of time from corresponding pulses of the first series, a space current device to which pulses in the second and third series are applied and being normally cut off to such an extent that it becomes conducting to produce an output pulse only when a pulse of the second series overlaps in time a pulse of the third series, means for producing a direct voltage from the pulses in the output of such space current device, and means for indicating said direct voltage.

2. A device adapted to have applied thereto a first series of pulses and a second series of pulses, the individual ones of which are time spaced from corresponding pulses of the first series by substantially equal periods, and to give an indication of the duration of said periods comprising means for forming a third series of voltage variations time spaced like the first series but in which the individual ones are displaced by a controllable and measurable period of time from corresponding pulses of the first series, a space current device to which pulses in the second and third series are applied and being normally cut off to such an extent that it becomes conducting to produce an output pulse only when a pulse of the second series overlaps in time a pulse of the third series, means for producing a direct voltage from the pulses in the output of such space current device, and means for indicating said direct voltage, said last-mentioned means including an electron ray device.

3. A device adapted to have applied thereto a first series of pulses and a second series of pulses, the individual ones of which are time spaced from corresponding pulses of the first series by substantially equal periods, and to give an indication of the duration of said periods comprising means for forming a third series of voltage variations time spaced like the first series but in which the individual ones are displaced by a controllable and measurable period of time from corresponding pulses of the first series, a space current device to which pulses in the second and third series are applied and being normally cut off to such an extent that it becomes conducting to produce an output pulse only when a pulse of the second series overlaps in time a pulse of the third series, means for producing a direct voltage from the pulses in the output of such space current device, an electron ray indicating device of the type comprising means for generating a stream of electrons, a control electrode, a fluorescent target for said electrons, and a shadow casting electrode which is connected to have its potential varied as the intensity of such stream is varied to thereby change the area of the shadow pattern on the screen, and means for applying said direct voltage to said control electrode to produce a pattern on the screen which is of much larger area than is the pattern thereon when said pulses are not applied to said electrode.

4. A device adapted to have applied thereto a first series of pulses and a second series of pulses, the individual ones of which are time spaced from corresponding pulses of the first series by substantially equal periods, and to give an indication of the duration of said periods comprising means for forming a third series of voltage variations time spaced like the first series but in which the individual ones are displaced by a controllable and measurable period of time from corresponding pulses of the first series, a space current device to which pulses in the second and third series are applied and being normally cut off to such an extent that it becomes conducting to produce an output pulse only when a pulse of the second series overlaps in time a pulse of the third series, means for producing a direct voltage from the pulses in the output of such space current device, and means for indicating said direct voltage, said means for producing a direct voltage comprising a condenser, a vacuum tube and a resistor connected to function as a peak vacuum tube voltmeter, the time constant of said condenser and resistor being considerably longer than the time between pulses in said first series.

5. A device adapted to have applied thereto a first series of pulses and a second series of pulses, the individual ones of which are time spaced from corresponding pulses of the first series by substantially equal periods, and to give an indication of the duration of said periods comprising means for forming a third series of voltage variations time spaced like the first series but in which the individual ones are displaced by a controllable and measurable period of time from corresponding pulses of the first series, a space current device to which pulses in the second and third series are applied and being normally cut off to such an extent that it becomes conducting to produce an output pulse only when a pulse of the second series overlaps in time a pulse of the third series, means for producing a direct voltage from the pulses in the output of such space current device, and means for indicating said direct voltage, said means for producing a direct voltage comprising a condenser, a resistor and a vacuum tube comprising an anode, a cathode and a control element connected to function as a peak vacuum tube voltmeter, said condenser being connected between the output circuit of said space current device and the cathode of said vacuum tube, and said resistor being connected between the cathode of said vacuum tube and a point of fixed potential.

6. Circuit means adapted to have applied thereto a series of pulses and to produce in the output thereof an undulating direct potential, comprising a condenser, a resistor, a source of fixed potential, a space current device comprising an anode, a cathode and a control element, a series circuit including said condenser, said resistor and said source of fixed potential and in which series circuit the condenser and resistor have a common terminal which is connected to said cathode and said source of fixed potential has its positive terminal connected to the terminal of said resistor remote from said common terminal, means connecting said control element to the negative terminal of said source of fixed potential, means placing the anode at a fixed potential positive with respect to the positive pole of said source of fixed potential, said potentials being such that in the absence of pulses said space current device is cut off, and means applying said series of pulses to said series circuit and through said condenser to said cathode to drive said cathode in a negative direction to thereby make the space current device conducting whereby said condenser has its state of charge varied by the flow of current through said resistor caused by the conduction of said space current device, which state of charge is again varied by leakage through said resistor in the interval between pulses, said condenser and resistor having a time constant which is considerably longer than the interval between pulses whereby an undulating direct potential is produced across said resistor.

7. In combination, an electron ray indicating device of the type comprising means for generating a stream of electrons, a control electrode, a fluorescent target for said electrons, and a shadow casting electrode which is connected to have its potential varied as the intensity of said stream is varied to thereby change the area of the shadow pattern on the screen, means for applying a series of pulses to said control electrode, each of said pulses having a very short duration compared to the time interval between pulses, and means responsive to each pulse in the series for generating and applying to said control electrode a voltage during at least a portion of the interval between successive pulses whereby the pattern on said screen which would have been produced by said pulses alone is made more distinct.

ALBERT M. SKELLETT.

REFERENCES CITED

The following references are of record in the file of this patent:

UNITED STATES PATENTS

| Number | Name | Date |
|---|---|---|
| 1,924,174 | Wolf | Aug. 29, 1933 |

Disclaimer 2,415,855.—*Albert M. Skellett*, Madison, N. J. RANGE INDICATOR. Patent dated Feb. 18, 1947. Disclaimer filed Mar. 3, 1950, by the assignee, *Bell Telephone Laboratories, Incorporated.*

Hereby enters this disclaimer to claims 1 and 4 of said patent.
[*Official Gazette April 4, 1950.*]